United States Patent
Backer et al.

(10) Patent No.: US 10,865,263 B2
(45) Date of Patent: Dec. 15, 2020

(54) SOLUTION POLYMERIZATION IN ISOPROPANOL AND WATER

(71) Applicants: Rohm and Haas Company, Collegeville, PA (US); Union Carbide Corporation, Seadrift, TX (US)

(72) Inventors: Scott Backer, Phoenixville, PA (US); Randara Pulukkody, Norristown, PA (US); Mahesh R. Sawant, Chester, PA (US); Eric P. Wasserman, Collegeville, PA (US)

(73) Assignees: Rohm and Haas Company, Collegeville, PA (US); Union Carbide Corporation, Seadrift, TX (US)

( * ) Notice: Subject to any disclaimer, the term of this patent is extended or adjusted under 35 U.S.C. 154(b) by 90 days.

(21) Appl. No.: 16/341,565

(22) PCT Filed: Oct. 24, 2017

(86) PCT No.: PCT/US2017/058029
§ 371 (c)(1),
(2) Date: Apr. 12, 2019

(87) PCT Pub. No.: WO2018/102052
PCT Pub. Date: Jun. 7, 2018

(65) Prior Publication Data
US 2020/0157263 A1     May 21, 2020

Related U.S. Application Data

(60) Provisional application No. 62/427,283, filed on Nov. 29, 2016.

(51) Int. Cl.
*C08F 218/08* (2006.01)
*C08F 2/06* (2006.01)
*C08F 222/02* (2006.01)
*C08F 220/06* (2006.01)
*C08F 2/10* (2006.01)

(52) U.S. Cl.
CPC .............. *C08F 218/08* (2013.01); *C08F 2/06* (2013.01); *C08F 2/10* (2013.01); *C08F 220/06* (2013.01); *C08F 222/02* (2013.01); *C08F 2800/20* (2013.01)

(58) Field of Classification Search
CPC ........ C08F 218/08; C08F 2/06; C08F 222/02; C08F 220/06; C08F 2/10; C08F 2800/20
USPC .......................................................... 526/70
See application file for complete search history.

(56) References Cited

U.S. PATENT DOCUMENTS

| 5,399,639 A * | 3/1995 | Kimpton .................. C08F 8/44 526/212 |
| 5,632,976 A | 5/1997 | Chandran et al. |
| 5,925,610 A | 7/1999 | Austin et al. |
| 8,084,561 B2 | 12/2011 | Kim et al. |

FOREIGN PATENT DOCUMENTS

| EP | 0337694 A2 | 10/1989 |
| EP | 0634428 A2 | 1/1995 |

\* cited by examiner

*Primary Examiner* — William K Cheung
(74) *Attorney, Agent, or Firm* — Kenneth Crimaldi

(57) ABSTRACT

A method for solution polymerization. The method comprises polymerizing in a solvent a monomer mixture comprising: (a) 5 to 95 wt % of a $C_3$-$C_5$ ethylenically unsaturated dicarboxylic acid; and (b) 5 to 95 wt % of vinyl acetate; wherein the solvent comprises 51 to 88 wt % isopropanol and 12 to 49 wt % water.

10 Claims, No Drawings

SOLUTION POLYMERIZATION IN ISOPROPANOL AND WATER

This application is a National Stage Application under 35 U.S.C. § 371 of PCT International Application No. PCT/US2017/058029, filed Oct. 24, 2017, which claims priority to U.S. Provisional Patent Application No. 62/427,283, filed Nov. 29, 2016, the entire contents of which are incorporated by reference herein.

BACKGROUND

This invention relates generally to a method for polymerization of vinyl and acrylic monomers in solution.

Solution polymerization of vinyl and acrylic monomers in mixed solvents is known. For example, U.S. Pat. No. 5,632,976 discloses polymerization of acrylamide monomers with acrylic acid and its esters in mixtures of water and organic solvent(s). However, this reference does not disclose a method for polymerization of the monomers claimed in the present invention.

STATEMENT OF INVENTION

The present invention is directed to a method for solution polymerization; said method comprising polymerizing in a solvent a monomer mixture comprising: (a) 5 to 75 wt % of a $C_3$-$C_5$ ethylenically unsaturated dicarboxylic acid; (b) 10 to 60 wt % of vinyl acetate; and (c) 10 to 50 wt % (meth)acrylic acid; wherein the solvent comprises 51 to 88 wt % isopropanol and 12 to 49 wt % water.

The present invention is further directed to a method for solution polymerization; said method comprising polymerizing in a solvent a monomer mixture comprising: (a) 5 to 95 wt % of a $C_3$-$C_5$ ethylenically unsaturated dicarboxylic acid; and (b) 5 to 95 wt % of vinyl acetate; wherein the solvent comprises 51 to 88 wt % isopropanol and 12 to 49 wt % water.

DETAILED DESCRIPTION

All percentages are weight percentages (wt %), and all temperatures are in ° C., unless otherwise indicated. Weight average molecular weights, $M_w$, are measured by gel permeation chromatography (GPC) using polyacrylic acid standards, as is known in the art. The techniques of GPC are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. The molecular weights reported herein are in units of daltons. As used herein the term "(meth)acrylic" refers to acrylic or methacrylic. Weight percentages in the reaction vessel are based on the entire weight of the vessel contents. Percentages of monomer units in the polymer are based on total polymer weight. All references to polymerized carboxylic acid units in the polymers include metal salts of the acid which would be present at pH values near or above the pKa of the carboxylic acid groups.

Preferably, the $C_3$-$C_5$ ethylenically unsaturated dicarboxylic acid is selected from the group consisting of maleic acid, maleic anhydride, itaconic acid, itaconic anhydride, citraconic acid and fumaric acid. Itaconic acid is especially preferred.

The monomers in the monomer mixture may be added to a solvent in a reaction vessel at different times, so that the composition of unpolymerized monomers in the reaction vessel at any time may not be within the limits stated herein, which are meant to represent only the total amounts of monomers added to the vessel. Preferably, the monomer mixture comprising a $C_3$-$C_5$ ethylenically unsaturated dicarboxylic acid, vinyl acetate and (meth)acrylic acid comprises at least 10 wt % of a $C_3$-$C_5$ ethylenically unsaturated dicarboxylic acid, preferably at least 15 wt %, preferably at least 20 wt %, preferably at least 25 wt %; preferably no more than 65 wt %, preferably no more than 55 wt %, preferably no more than 50 wt %, preferably no more than 45 wt %, preferably no more than 40 wt %, preferably no more than 35 wt %. Preferably, this monomer mixture comprises at least 20 wt % of vinyl acetate, preferably at least 25 wt %, preferably at least 30 wt %, preferably at least 35 wt %; preferably no more than 55%, preferably no more than 50 wt %, preferably no more than 45 wt %. Preferably, this monomer mixture comprises at least 15 wt % of (meth)acrylic acid, preferably at least 20 wt %, preferably at least 25 wt %; preferably no more than 65 wt %, preferably no more than 55 wt %, preferably no more than 50 wt %, preferably no more than 45 wt %, preferably no more than 40 wt %, preferably no more than 35 wt %.

Preferably, the monomer mixture comprising a $C_3$-$C_5$ ethylenically unsaturated dicarboxylic acid and vinyl acetate comprises at least 10 wt % polymerized units of a $C_3$-$C_5$ ethylenically unsaturated dicarboxylic acid, preferably at least 15 wt %, preferably at least 20 wt %, preferably at least 25 wt %, preferably at least 30 wt %, preferably at least 35 wt %, preferably at least 39 wt %, preferably at least 42 wt %; preferably no more than 70 wt %, preferably no more than 65 wt %, preferably no more than 61 wt %, preferably no more than 58 wt %, preferably no more than 55 wt %, preferably no more than 53 wt %, preferably no more than 51 wt %, preferably no more than 50 wt %. Preferably, this monomer mixture comprises at least 30 wt % of vinyl acetate, preferably at least 35 wt %, preferably at least 39 wt %, preferably at least 42 wt %, preferably at least 45 wt %, preferably at least 47 wt %, preferably at least 49 wt %; preferably no more than 90 wt %, preferably no more than 85 wt %, preferably no more than 80 wt %, preferably no more than 75 wt %, preferably no more than 70 wt %, preferably no more than 65 wt %, preferably no more than 61 wt %, preferably no more than 58 wt %.

Preferably, the solvent comprises at least 55 wt % isopropanol, preferably at least 60 wt %, preferably at least 65 wt %, preferably at least 70 wt %; preferably no more than 85 wt %, preferably no more than 82 wt %; preferably no more than 80 wt %. Preferably, the solvent comprises at least 15 wt % water, preferably at least 18 wt %, preferably at least 20 wt %; preferably no more than 45 wt %, preferably no more than 40 wt %, preferably no more than 35 wt %, preferably no more than 30 wt %.

Preferably, from 0 to 100 wt % of polymerized vinyl acetate units are hydrolyzed to the alcohol; preferably at least 10 wt %, preferably at least 15 wt %; preferably no more than 70 wt %, preferably no more than 50 wt %. In a preferred embodiment, at least 50 wt % of the vinyl acetate units are hydrolyzed, preferably at least 70 wt %, preferably at least 80 wt %.

Preferably, a polymer of this invention comprises no more than 0.3 wt % polymerized units of crosslinking monomers, preferably no more than 0.1 wt %, preferably no more than 0.05 wt %, preferably no more than 0.03 wt %, preferably no more than 0.01 wt %. A crosslinking monomer is a multi-ethylenically unsaturated monomer.

Preferably, the amount of polymerized AMPS units (including metal or ammonium salts) in a solution polymer of this invention is no more than 10 wt %, preferably no more than 5 wt %, preferably no more than 2 wt %, preferably no more than 1 wt %. Preferably, a polymer of this invention contains no more than 8 wt % polymerized units of esters of acrylic or methacrylic acid, preferably no more than 5 wt %, preferably no more than 3 wt %, preferably no more than 1 wt %. Preferably, a polymer of this invention contains no more than 5 wt % total polymerized units of (meth)acrylamide, N-alkylated (meth)acrylamide and N,N-dialkylated (meth)acrylamide; preferably no more than 3 wt %, preferably no more than 1 wt %, preferably no more than 0.5 wt %. Preferably, a polymer of this invention contains no more than 5 wt % total polymerized units of vinyl esters of higher molecular weight than vinyl acetate; preferably no more than 3 wt %, preferably no more than 1 wt %, preferably no more than 0.5 wt %. Preferably, a polymer of this invention contains no more than 5 wt % total polymerized units of halogen-containing monomers; preferably no more than 3 wt %, preferably no more than 1 wt %, preferably no more than 0.5 wt %. Preferably, a polymer of this invention contains no more than 5 wt % total polymerized units of carboxylic acid or sulfonic acid monomers other than $C_3$-$C_5$ ethylenically unsaturated dicarboxylic acids and (meth)acrylic acid; preferably no more than 3 wt %, preferably no more than 1 wt %, preferably no more than 0.5 wt %.

Preferably, the solution polymer produced in this invention has $M_w$ of at least 2,000, preferably at least 5,000, preferably at least 7,000, preferably at least 9,000, preferably at least 11,000, preferably at least 12,000; preferably no more than 70,000, preferably no more than 50,000, preferably no more than 30,000, preferably no more than 25,000, preferably no more than 20,000.

The polymer may be used in an automatic dishwashing detergent in combination with other polymers useful for controlling insoluble deposits in automatic dishwashers, including, e.g, polymers comprising combinations of residues of acrylic acid, methacrylic acid, maleic acid or other diacid monomers, esters of acrylic or methacrylic acid including polyethylene glycol esters, styrene monomers, AMPS and other sulfonated monomers, and substituted acrylamides or methacrylamides.

Preferably, the polymer of this invention is a random copolymer. Preferred initiators include organic peroxides, inorganic persulfates, organic azo compounds (e.g., 2,2'-azobis(2-methylpropionitrile) (AIBN)) and hydroperoxides (e.g., t-butyl hydroperoxide). In a preferred embodiment, the initiator is inorganic. Preferably, the initiator does not contain phosphorus. Preferably, the polymer contains less than 1 wt % phosphorus, preferably less than 0.5 wt %, preferably less than 0.1 wt %, preferably the polymer contains no phosphorus. Preferably, the dicarboxylic acid monomer is added to the reactor first. Preferably, the reaction mixture comprising the monomers, solvent and initiator is heated to a temperature from 50 to 100° C. Preferably, the initial reaction period during which the polymerization is substantially completed, is from one to eight hours, preferably two to six hours. Preferably, after an initial reaction period, water is added to the reaction mixture while a water/isopropanol azeotrope is distilled from the mixture. Preferably, the mixture remaining after the distillation has from 35 to 45 wt % polymer in water. Preferably, the distilled azeotrope is recycled to the polymerization reaction. In a preferred embodiment, the distillation step is also a hydrolysis under acidic or basic catalysis. The pH is preferably lowered to <2.5 or kept above 12 to allow the vinyl acetate residues to be hydrolyzed to vinyl alcohol residues and acetic acid or acetate salts.

EXAMPLES

Example 1

AA/IA/VAc terpolymer (30/30/40 composition) synthesis in mixed solvents, IPA/Water: 75/25 using tert butyl peroxypivalate as the initiator A two liter round bottom flask was equipped with a mechanical stirrer, heating mantle, thermocouple, condenser and inlets for the addition of monomer and initiator. An initial mixture of 62 g (24.8%) of water and 188 g (75.2%) isopropanol (IPA) was charged into the kettle. The kettle contents were set to stir and 65 g (30%) of itaconic acid monomer (IA) was charged into the kettle, together with a 5 g (2%) heel charge of t-butyl peroxypivalate initiator. The kettle contents were heated to 80° C. A monomer feed was prepared by mixing together vinyl acetate (VAc) (86 g, 40%) and acrylic acid (AA) (65 g, 30%) monomers, and was fed into the reaction kettle over 2 hours. An initiator feed consisting of 10 g (4.63%) t-butyl peroxypivalate dissolved in 35 g IPA was fed over a period of 2.5 hrs. The reaction ran under reflux, and was held at 80 C for a further 2 hrs. The resulting transparent product was poured out and packed at 40 C. A 200 g portion of this sample was used in a solvent exchange process, where 200 g of water was continuously added while removing kettle solvent via a simple Dean-Stark trap. The pH of the final product was adjusted to neutral with 50% NaOH with cooling. Final product solids 39%, molecular weight Mw 22903, Mn 3280, Mw/Mn 6.98. Residual monomer contents were <100 ppm for acrylic acid and itaconic acid. The residual monomer content was 7944 ppm for vinyl acetate monomer prior to solvent exchange, which reduced to <100 ppm after. Monomer incorporation ratios in the final polymer as determined by $^{13}$C NMR spectra were 30% Acrylic acid/35% Itaconic acid/35% Vinyl Acetate.

Example 2 (RP 1034)

Acrylic acid/Itaconic acid/Vinyl Acetate terpolymer (30/30/40 composition) synthesis in mixed solvents, IPA/Water: 75/25 using Sodium persulfate as the initiator A two liter round bottom flask was equipped with a mechanical stirrer, heating mantle, thermocouple, condenser and inlets for the addition of monomer and initiator. An initial mixture of 52.7 g of water and 187.5 g IPA was charged into the kettle with 65 g of itaconic acid monomer. The kettle contents were heated to 80° C. and a heel charge of sodium persulfate, prepared by dissolving 5 g of the salt in 10 g of water was added into the kettle. The synthesis process described in example 1 above was repeated, where an initiator feed consisting of 10 g (4.63%) sodium persulfate dissolved in 35 g water was fed over a period of 2.5 hrs. and followed by Dean Stark solvent exchange, as described above in example 1. Final product solids 32%, molecular weight Mw 18620, Mn 2541, Mw/Mn 7.32. Residual monomer contents were <50 ppm for acrylic acid and itaconic acid. The residual monomer content was <500 ppm for vinyl acetate monomer even prior to solvent exchange. Monomer incorporation ratios in the final polymer as determined by $^{13}$C NMR spectra were 45% Acrylic acid/37% Itaconic acid/13% Vinyl Acetate, with 5% Vinyl Alcohol.

Comparative Example 1: AA/Mal/VAc in water (according to U.S. Pat. No. 5,830,956, Example 1)

A round-bottom flask equipped with reflux condenser, overheat stirrer, heating mantle, and thermocouple was charged with 63.8 g maleic anhydride, 259 g deionized water, 0.0035 g FeSO4, and 93.6 g NaOH solution (50% in water). The mixture was stirred and heated to 85° C. Upon reaching this temperature, a monomer mixture containing acrylic acid (81.4 g), vinyl acetate (42.1 g), and water (100 g) was begun and continued for 4 h, and a second initiator solution containing 18.7 g hydrogen peroxide 30% solution and 54 g deionized water was begun and continued for 4.5 h, during which period the temperature was allowed to rise to 92° C. The reaction mixture was held at this temperature for an additional 1.5 h after the initiator feed had ended. After cooling to room temperature, 122.4 g of NaOH solution (50% in water) was slowly added with stirring, in order to keep the temperature below 55° C., which made the solution strongly basic for hydrolysis. After 1 h of reflux at a temperature of 101-102° C., the reaction was again allowed to cool and the mixture was brought to neutral (~7) by the addition of 31.5 g of HCl solution (37%). The product was found to contain 2,300 ppm residual acrylic acid and 20,000 ppm residual maleic acid. Mw/1000=42.9; Mn/1000=5.4 (GPC).

Comparative Example 2: AA/Maleic/VAc in IPA

A two liter round bottom flask was equipped with a mechanical stirrer, heating mantle, thermocouple, condenser and inlets for the addition of monomer and initiator. An initial mixture of 250 g IPA was charged into the kettle and 65 g of maleic anhydride monomer was added to this. A process identical to that described in example 1 above was followed, resulting in a transparent, light orange product that was poured out at 40 C. A portion of this product was subject to solvent exchange and neutralized as described in example 1. Final product solids 39.5%, molecular weight Mw 4568, Mn 1205, Mw/Mn 3.8. Residual monomer contents prior to solvent exchange were 6528 ppm for acrylic acid, 3250 ppm maleic acid and 33197 ppm vinyl acetate.

Example 3

AA/Maleic/VAc terpolymer (30/30/40 composition) synthesis in mixed solvents, IPA/Water: 75/25 using tert butyl peroxypivalate as the initiator A two liter round bottom flask was equipped with a mechanical stirrer, heating mantle, thermocouple, condenser and inlets for the addition of monomer and initiator. An initial mixture of 63.9 g (25.4%) of water and 188 g (74.6%) IPA was charged into the kettle. The kettle contents were set to stir and 65 g (30%) of maleic anhydride was charged into the kettle. The kettle contents were heated to 80° C. An initiator feed was prepared using 15 g (6.9%) of t-butyl peroxypivalate in 35 g of IPA. At temperature, the initiator was fed into the kettle for two minutes before the monomer feed started. Similar to example 1, the monomer feed was prepared by mixing together vinyl acetate (86 g, 40%) and acrylic acid (65 g, 30%) monomers, and was fed into the reaction kettle over 2 hours. The initiator was fed over a total time of 152 mins. The reaction ran under reflux, and was held at 80 C for a further 30 mins A chase feed consisting of 1 g (0.4%) t-butyl peroxypivalate in 5 g of water was fed over 10 mins followed by a 30 min hold and another identical chase over 10 mins. The reaction was held for a final 40 mins, and the contents were poured out as a transparent, colorless final product. A portion of this product was solvent exchanged with water and neutralized as described in example 1. Final product solids 43%, molecular weight Mw 4793, Mn 1535, Mw/Mn 3.12. Residual monomer contents were <50 ppm for acrylic acid and maleic acid. The residual monomer content was 19992 ppm for vinyl acetate monomer prior to solvent exchange, which reduced to <100 ppm after. Composition of the final product as determined by $^{13}C$ NMR spectra were 25% acrylic acid/32% maleic acid/20% vinyl acetate, with approximately 22% by weight of esterified species and sodium acetate.

The invention claimed is:

1. A method for solution polymerization; said method comprising polymerizing in a solvent a monomer mixture comprising: (a) 5 to 75 wt % of a $C_3$-$C_5$ ethylenically unsaturated dicarboxylic acid; (b) 10 to 60 wt % of vinyl acetate; and (c) 10 to 50 wt % (meth)acrylic acid; wherein the solvent comprises 51 to 88 wt % isopropanol and 12 to 49 wt % water.

2. The method of claim 1 in which the monomer mixture comprises:
   (i) 10 to 45 wt % itaconic acid, (ii) 20 to 50 wt % of vinyl acetate; and (iii) 15 to 45 wt % acrylic acid.

3. The method of claim 2 in which the solvent comprises 60 to 85 wt % isopropanol and 15 to 40 wt % water.

4. The method of claim 3 in which the polymer has $M_w$ from 2,000 to 70,000.

5. The method of claim 4 in which an isopropanol-water azeotrope is distilled and recycled to a polymerization reaction.

6. A method for solution polymerization; said method comprising polymerizing in a solvent a monomer mixture comprising: (a) 5 to 95 wt % of a $C_3$-$C_5$ ethylenically unsaturated dicarboxylic acid; and (b) 5 to 95 wt % of vinyl acetate; wherein the solvent comprises 51 to 88 wt % isopropanol and 12 to 49 wt % water.

7. The method of claim 6 in which the polymer comprises polymerized units of:
   (i) 20 to 58 wt % itaconic acid and (ii) 42 to 80 wt % of vinyl acetate.

8. The method of claim 7 in which the solvent comprises 60 to 85 wt % isopropanol and 15 to 40 wt % water.

9. The method of claim 8 in which the polymer has $M_w$ from 2,000 to 70,000.

10. The method of claim 9 in which an isopropanol-water azeotrope is distilled and recycled to a polymerization reaction.

* * * * *